UNITED STATES PATENT OFFICE.

ADOLPHE HENRI DESGRAZ, OF HANOVER, GERMANY.

PROCESS OF EXTRACTING ZINC FROM RESIDUES CONTAINING ZINC, ESPECIALLY SLAGS, IN REVERBERATORY FURNACES.

1,072,209.

Specification of Letters Patent.   Patented Sept. 2, 1913.

No Drawing.   Application filed July 31, 1911.   Serial No. 641,397.

*To all whom it may concern:*

Be it known that I, ADOLPHE HENRI DESGRAZ, engineer, a citizen of Switzerland, residing at Hanover, German Empire, have invented certain new and useful Improvements in Processes of Extracting Zinc from Residues Containing Zinc, Especially Slags, in Reverberatory Furnaces, of which the following is a specification.

The hitherto known processes for extracting zinc from residues containing zinc, especially slags from zinc and copper blast furnaces depend mainly on the fact that the finely powdered material is mixed with reducing agents, such as bodies containing carbon, metallic iron or iron alloys, and then formed into briquets and that these briquets were then, either alone or mixed with pieces of zinc containing materials, reduced with coke in a furnace, especially a blast furnace, whereby the zinc escapes in the form of vapor and by the admission of air is oxidized and the mass from which zinc has been extracted fuses and flows continually from the furnace. This process in consequence of the necessity of forming the material into briquets is very expensive and permits only of the employment of cold and solid material.

For the purpose of reducing the cost of forming the briquets it has been proposed to employ slags in the molten condition, that is in the condition in which they come directly from the blast furnace, and these are passed through a column of live coke for the purpose of effecting the extraction of the zinc. This process, however, has not led to any favorable results.

The process for extracting zinc which forms the object of this invention is adapted to obviate the formation of briquets from cold slags, as also to treat the slag in the molten condition coming directly from the blast furnace in a reverberatory furnace by the employment of its own heat. It has been ascertained that the extraction of zinc from such slags by reducing agents alone is not wholly satisfactory and thus even with an excess of reducing agents a more or less large content of zinc remains in the final product according to the composition of the slag. This is due to the fact that the duration of the action of the reducing agents, on the material to be smelted in shaft furnaces, is very slight in consequence of the automatic sinking of the charge, and further that a chemical equilibrium of the ferro-zinc-silicates contained in the slag is gradually produced, in which state the reducing agents even when in contact with the molten charge for considerable time will no longer have any effect.

The property of the ferro-silicates, of combining with zinc oxid, is known in metallurgy and it is employed in working off complex lead-copper-zinc ores in blast furnaces. In these cases when charging the ores it is endeavored by the addition of slags rich in iron, iron ores, &c., to form a slag which, in consequence of its content of ferro-silicates, has the capacity of combining with zinc oxid and to form this into slag and even in the presence of large quantities of coke as the reducing agent to retain it in the blast furnace. Numerous researches have proved that zinc can easily be extracted from such a ferro-zinc-silicate in the molten condition by the addition of a strong base. A base acting in this manner is, for example, calcium oxid, which in the form of lime or limestone is the cheapest and most effective base.

It is known that, on working off the above mentioned complex ores, the content of lime in the slag counteracts the slagging of the zinc oxid and the formation of zinc-ferro-silicates, and if it is sufficiently high, these are impossible.

Our researches have shown that calcium oxid has the capacity of decomposing a ferro-zinc-silicate which has already been formed in such manner, that CaO replaces ZnO and, as ZnO becomes volatile at high temperatures, this latter is driven off. This gives us a means of extracting zinc from such slags with a more favorable result, to obviate the formation of briquets and to directly treat slags which are already in a molten condition when they come from the blast furnace.

The new process is carried out in a reverberatory furnace and not as most others in a blast furnace.

The slags are either smelted in the reverberatory furnace itself, or, if it is desired to treat them, directly they come from the blast furnace, they are admitted in the molten condition into the reverberatory furnace. When the molten mass is thoroughly in the molten condition the zinc extracting agents are added. These zinc extracting agents consist of bodies containing carbon, such as coal, coke, &c., and metallic iron or iron alloys as reducing agents and of basic bodies, such as lime or limestone as reaction agents. The reducing agents can be added first and then the lime or limestone can be employed or the reducing agents and the reaction agents can be mixed together and employed simultaneously. The quantity of CaO which is added depends upon the content of zinc and lime of the slag, and it has proved favorable for carrying out the process to so choose the quantity of the matter added that the final product, that is the slag from which the zinc has been extracted, contains from 25 to 35% CaO.

When the addition has been made and fused, the reactions take place, that is, the generation of zinc vapors, which in the atmosphere of the furnace are formed into zinc oxid, and volatile zinc oxid. The zinc is extracted fairly rapidly but can be greatly accelerated by stirring and moving the charge. If the charge contains other metals which can easily be reduced such for example as lead, and so on, these are simultaneously reduced and extracted.

The feature of the invention therefore consists in that, for the purpose of accelerating and completely extracting the zinc from the charge which is in the molten condition reaction agents in the form of strong bases are added exclusively besides the normal reducing agents, which reaction agents drive off the zinc oxid as such from the complex silicates. This process can also be employed for treating other residues containing zinc ores of a poor quality, etc., if these are smelted with such additional substance that an easily fusible zinc ferro-silicate is produced and then treating these in the same manner with the zinc extracting agents. The zinc oxid is collected in the usual manner.

Claims.

1. The process of recovering easily reducible and volatile metal from substances containing the same, which consists in forming such substances to a molten liquid bath of slag, and re-acting upon said molten bath with a suitable basic agent, thereby driving off said metal from the bath.

2. The process of recovering zinc and other easily reducible and volatile metals from slag and the like, which consists in forming the slag to a molten bath, and re-acting upon said molten bath with a suitable basic agent, thereby driving off the volatile metal constituents of the bath.

3. The process of recovering zinc and other easily reducible and volatile metals from molten liquid slag, which consists in re-acting upon said molten slag with a suitable basic agent added thereto, thereby driving off the volatile metallic values of the slag.

4. The process of recovering zinc and other easily reducible and volatile metals from slag and like substances containing the same, which consists in forming said substances to a molten liquid bath, and re-acting upon said molten bath with calcium oxid, thereby driving off the volatile metallic values of the molten bath.

5. The process of recovering zinc and like volatile metals from slag, which consists in reducing the slag to a molten liquid bath, re-acting upon said molten bath with a suitable basic agent and a suitable reducing material, thereby driving off the volatile metallic values of the molten bath.

6. The process of recovering zinc and other easily reducible and volatile metals from slag and like substances containing the same, which consists in forming said substances to a molten liquid bath, and re-acting upon said molten bath with calcium oxid and a suitable reducing agent, thereby driving off the volatile metallic values of the molten bath.

In testimony whereof I have hereunto set my hand in presence of two subscribing witnesses.

ADOLPHE HENRI DESGRAZ.

Witnesses:
ROBERT J. THOMPSON,
MAETA L. THOMPSON.